United States Patent
Wakisaka et al.

(10) Patent No.: US 6,253,883 B1
(45) Date of Patent: Jul. 3, 2001

(54) BRAKE DRUM WITH PARALLEL GROOVES

(75) Inventors: Toshiaki Wakisaka; Kazuyuki Fujita, both of Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/129,889

(22) Filed: Aug. 6, 1998

(30) Foreign Application Priority Data

Aug. 7, 1997 (JP) .................................................. 9-213417

(51) Int. Cl.⁷ ............................. F16D 65/10; F16D 65/06
(52) U.S. Cl. ...................... 188/74; 188/77 R; 188/18 R; 188/218 R; 188/250 E; 188/264 B; 188/250 A; 188/249; 188/259
(58) Field of Search ........................... 188/74–76, 218 R, 188/264 R, 264 B, 77 W, 77 R, 249, 259, 250 A, 250 E, 71.1, 73.1, 24.22, 261, 264 E, 218 A, 18 R, 17; 192/113.36, 80, 107 T

(56) References Cited

U.S. PATENT DOCUMENTS

| | | | |
|---|---|---|---|
| 925,304 | * 6/1909 | Cummings | 188/75 |
| 1,304,481 | * 5/1919 | Hollis | 188/259 |
| 1,553,670 | * 9/1925 | Cautley | 188/218 R |
| 1,818,100 | * 8/1931 | Shields | 188/218 R |
| 1,919,760 | * 7/1933 | Wood . | |
| 2,041,935 | * 5/1936 | Kliewer . | |
| 2,164,300 | * 6/1939 | Smith, Jr. | 188/77 R |
| 2,476,151 | * 7/1949 | Le Jeune | 188/218 R |
| 2,516,544 | * 7/1950 | Breeze | 188/264 E |
| 3,007,553 | * 11/1961 | Sinclair et al. | 188/218 R |
| 3,066,766 | * 12/1962 | Minor et al. | 188/218 R |
| 3,811,542 | * 5/1974 | Hamrick et al. . | |
| 3,889,786 | * 6/1975 | Schrader et al. | 188/218 R |
| 4,787,483 | * 11/1988 | Stefanutti . | |
| 5,535,855 | * 7/1996 | Hanada . | |

FOREIGN PATENT DOCUMENTS

| | | | |
|---|---|---|---|
| 244785 | * 1/1966 | (AT) | 188/250 B |
| 632122 | * 12/1961 | (CA) | 188/218 R |
| 1136988 | * 11/1955 | (FR) | 188/218 R |
| 1124004 | * 8/1968 | (GB) | 188/218 R |
| 18579 | * 2/1977 | (JP) | 188/250 E |
| 97537 | * 7/1980 | (JP) | 188/250 E |
| 189428 | * 8/1991 | (JP) | 188/218 R |
| 7-12150 | * 1/1995 | (JP) . | |
| 8170667 | * 7/1996 | (JP) . | |
| 8177903 | * 7/1996 | (JP) . | |

* cited by examiner

Primary Examiner—Douglas C. Butler
(74) Attorney, Agent, or Firm—Sughrue, Mion, Zinn, Macpeak & Seas, PLLC

(57) ABSTRACT

In the brake drum, a plurality of grooves are formed on the slid surface thereof in such a manner that the grooves respectively extend in parallel to the sliding direction of the brake drum.

8 Claims, 5 Drawing Sheets

BRAKE DRUM WITH PARALLEL GROOVES

BACKGROUND OF THE INVENTION

1. Field of the Invention

The present invention relates to a brake drum for use in the brakes which are provided in an automatic transmission in a vehicle and the like.

2. Description of the Related Art

In a conventional brake drum, since no groove is formed in a slide surface with respect to a brake band, a proper lubrication condition cannot be provided in a friction surface thereof. Accordingly, it is difficult to stabilize the friction property of the brake band as well as to enhance the heat resistance and durability of the brake band.

In view of this, conventionally, there is proposed a structure in which a spiral-shaped (screw-shaped) groove is formed on the slide surface of the brake drum. An example of such structure is shown in FIG. 2. In FIG. 2, reference character 10 designates a brake band, while 12 stands for a belt-shaped member, and 14 expresses another belt-shaped member which is located inside the belt-shaped member 12. Also, 20 designates a brake drum, and 22 stands for a spiral groove formed on the slide surface of the brake drum 20. In the structure shown in FIG. 2, the spiral groove 22 includes in the right and left portions thereof two grooves 22a and 22b which are different in the spiral directions thereof from each other.

If the spiral-shaped groove is formed on the slide surface of the brake drum in this manner, then a proper wet condition can be formed on the friction surface of the brake band, which in turn makes it possible to stabilize the friction property of the brake band as well as to enhance the heat resistance and durability of the brake band. In FIG. 3, there is shown the torque waveform comparison of the above-mentioned conventional drums, where the horizontal axis expresses a time t and the vertical axis expresses a torque T. In FIG. 3, a dotted line A shows a torque waveform obtained when the conventional brake drum including no groove thereon, whereas a solid line B illustrates a torque waveform obtained when the conventional brake drum including a groove thereon. Also, in this graphical representation, a point a designates a point of starting of brake application, whereas a point b stands for a point of stop of rotation.

In the conventional groove-less brake drum shown by the dotted line A, the biting torque at the brake start point a is high but it tends to decrease as the brake works on, which unfavorably results in the unstabilized friction property. On the other hand, in the conventional grooved brake drum, as shown by the solid line, between the two points a and b, the torque remains unchanged and thus the property thereof can be stabilized.

Further, in FIG. 4, there is shown the relation between the torque and brake band pressure. In FIG. 4, the horizontal axis expresses a time t, and the vertical axis stands for the torque T and brake band pressure F; and, a dotted line shows the torque obtained when the conventional groove-less brake drum is used, and a solid line B shows the torque obtained when the conventional grooved brake drum is used, while a solid line C shows the brake band pressure.

In the groove-less brake drum shown by the dotted line A, as shown by a D portion in FIG. 4, at the point a where braking is started, an initial torque is increased suddenly to thereby cause a speed change shock; whereas, in the grooved brake drum, as shown by the solid line B, the torque varies gently so that the speed change shock can be reduced.

In a torque-time curved line shown in FIG. 5, if it is assumed that a friction coefficient at a point a where braking is started is expressed as $\mu_d$ and a friction coefficient at a point b where rotation is stopped is expressed $\mu_o$, in order to provide a stable friction property, the nearer to 1 a ratio of $\mu_o/\mu_d$ is, the better.

In FIG. 6, if it is assumed that the horizontal axis expresses a groove depth S and the vertical axis expresses the ratio of $\mu_o/\mu_d$, at a point A where the groove depth S is 0 (that is, no groove is formed), the ratio of $\mu_o/\mu_d$ is smaller than 1. However, if a value obtained when the brake drum includes a groove is expressed by a point B, then the ratio of $\mu_o/\mu_d$ can be made to approach 1 by selecting a proper value for the groove depth S.

In FIG. 7, if it is assumed that the horizontal axis expresses a groove pitch p and the vertical axis expresses the ratio of $\mu_o/\mu_d$ at a point A where the groove pitch is 0 (that is, no groove is formed), the ratio of $\mu_o/\mu_d$ is smaller than 1. However, if a value obtained when the brake drum includes a groove is expressed by a point B, then the ratio of $\mu_o/\mu_d$ can be made to approach 1 by selecting a proper value for the groove pitch p. As can be seen from FIGS. 6 and 7, the ratio of $\mu_o/\mu_d$ decreases gradually as the groove depth S and groove pitch p increase respectively.

As described above, formation of the spiral-shaped groove on the slide surface of the brake drum can provide a proper lubrication condition on the friction surface of the brake band, thereby being able to stabilize the friction property of the brake band as well as enhance the heat resistance and durability of the brake band. However, because the spiral-shaped groove has a certain angle with respect to the sliding direction of the brake drum due to its screw shape, that is, because the spiral-shaped groove is not parallel to the sliding direction of the brake drum, when such brake drum is used continuously, the friction member or brake band is shaved and is thus worn, which impairs the function of the brake band greatly.

SUMMARY OF THE INVENTION

It is an object of the invention to provide, for use in a brake provided in an automatic transmission in a vehicle and the like, a brake drum which can stabilize its friction property with respect to a brake band as well as can enhance its heat resistance and durability.

The present invention provides a brake drum in which a plurality of grooves are formed on a slide surface thereof in such a manner that the grooves respectively extend in parallel to the sliding direction.

Now, FIG. 8 shows the relation between a brake drum 20 and a spiral groove 22 in a typical manner, and FIG. 9 is a side view of FIG. 8, while reference character 23 designates a drum shaft. In FIG. 8, θ expresses the groove attack angle of the spiral groove 22. In FIG. 10, the horizontal axis expresses the groove attack angle θ which ranges not only from an angle of 0° C. (that is, the groove is not a spiral groove but it extends in parallel to the slide surface of the brake drum 20) to an angle of minus 0.5° C. but also from the angle of 0° C. to an angle of plus 0.5° C., whereas the vertical axis expresses variations in the ratio of $\mu_o/\mu_d$ over the above-mentioned attack angle ranges. From this graphical representation, it can be found that, when the groove attack angle θ is varied from the angle of minus 0.5° C. to the angle of plus 0.5° C. and the values of the ratio of $\mu_o/\mu_d$ are then plotted, the values vary little. This proves that, even if the groove attack angle θ is set for 0 (that is, the groove is so formed as to extend in parallel to the sliding direction of the brake drum), the stability of the friction property of the brake band can be left unchanged.

PREFERRED EMBODIMENTS OF THE INVENTION

Preferred embodiments of the present invention will be described as follows referring to the accompanying drawings.

Figure 1:
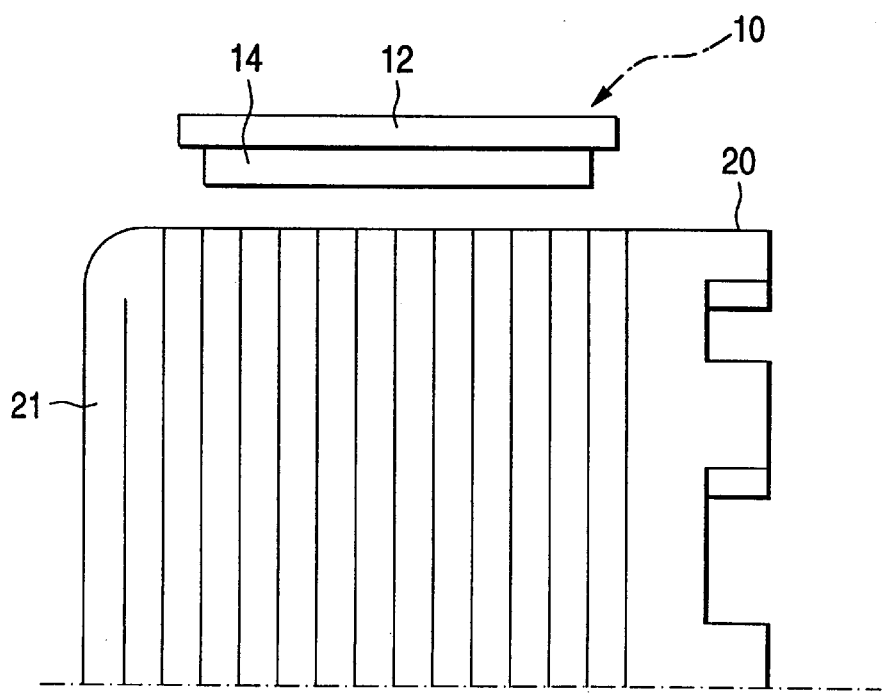
FIG. 1 is a schematic view of a brake drum according to the invention.
Figure 2:
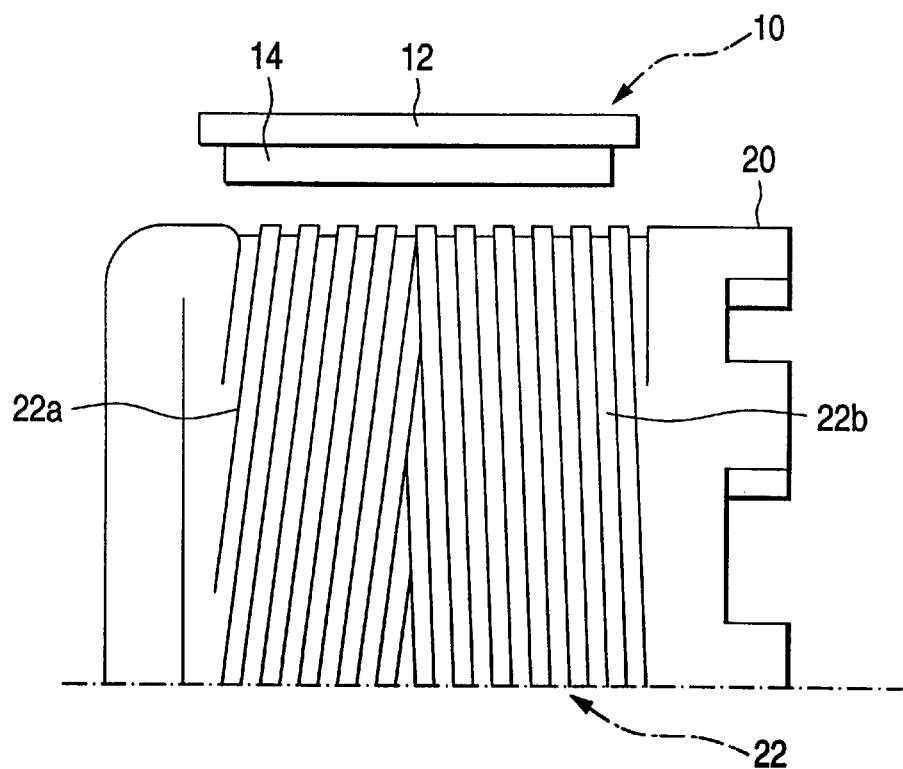
FIG. 2 is a schematic view of a conventional brake drum.
Figure 3:
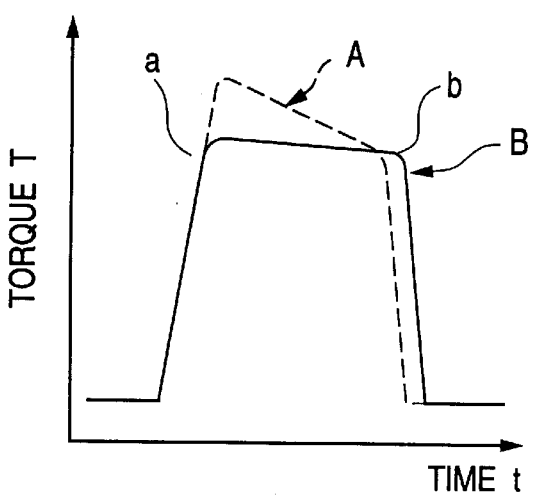
FIG. 3 is a graphical representation of the relation between the torque and time.
Figure 4:
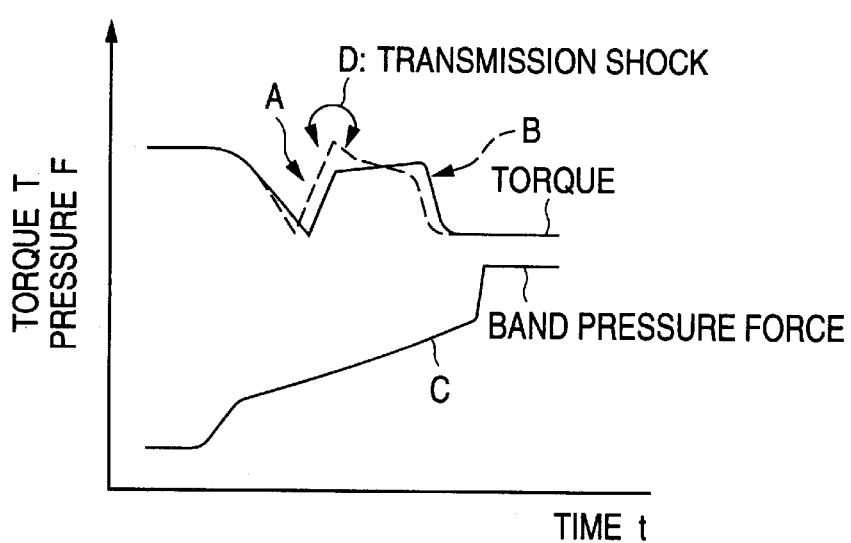
FIG. 4 is a graphical representation of the relation between the torque and band pressure.
Figure 5:
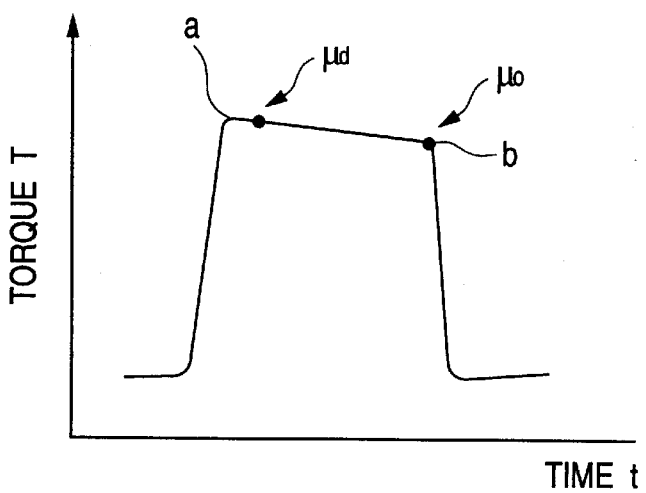
FIG. 5 is a graphical representation of the relation between the operation of a brake and a friction coefficient $\mu$.
Figure 6:
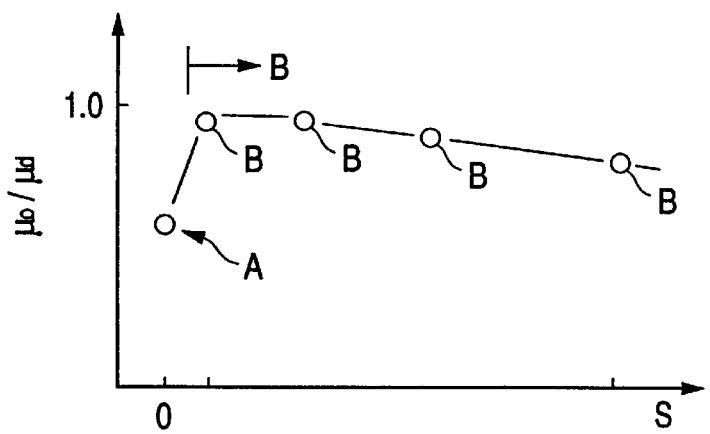
FIG. 6 is a graphical representation of the relation between the groove depth of and the ratio of friction coefficients $\mu_o/\mu_d$.
Figure 7:
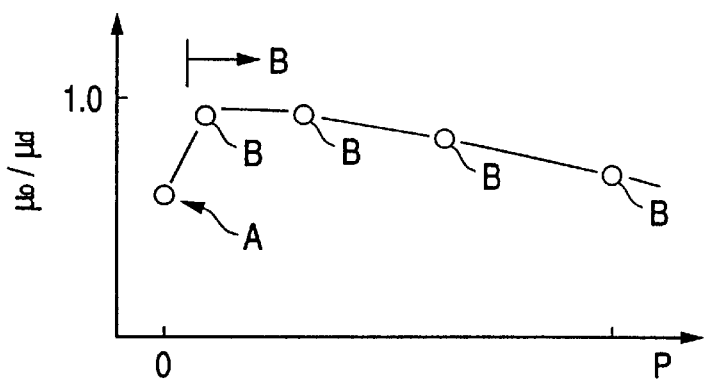
FIG. 7 is a graphical representation of the relation between the pitch of a groove and the ratio of friction coefficients $\mu_o/\mu_d$.
Figure 8:
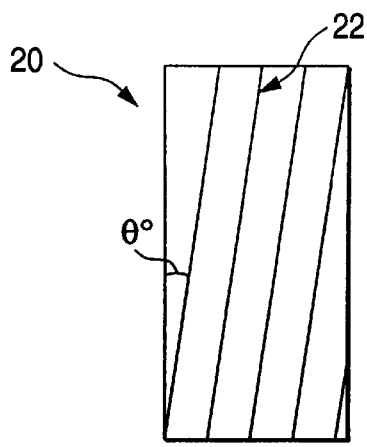
FIG. 8 is a schematic view of a brake drum, showing the relation between the brake drum and the angle of a groove formed therein.
Figure 9:
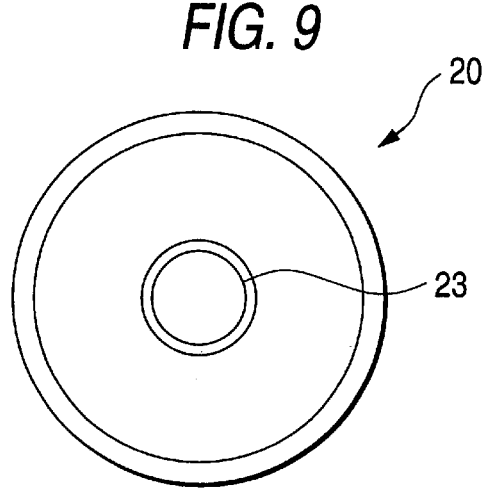
FIG. 9 is a side view of FIG. 8.
Figure 10:
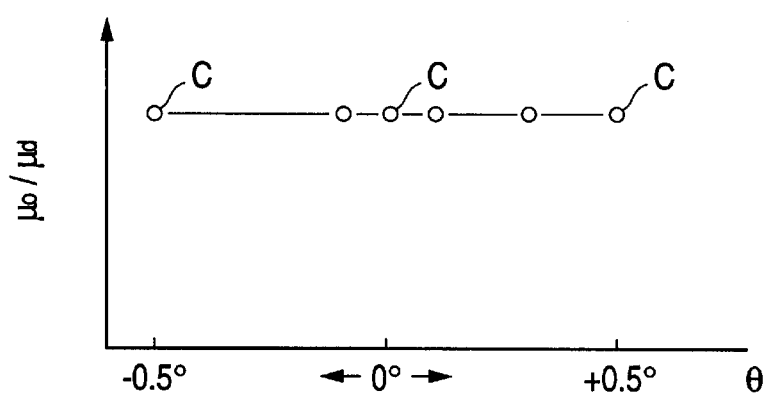
FIG. 10 is a graphical representation of the relation between the angle of a groove and the ratio of friction coefficients $\mu_o/\mu_d$.

FIG. 1 shows a brake drum according to the invention, in which reference character 10 designates a brake band; 12, a belt-shaped member; 14, a lining member; 20, a brake drum; and 21, a plurality of grooves which are formed on the slide surface of the brake drum 20 and extend in parallel to the sliding direction of the brake drum 20.

Figure 11:
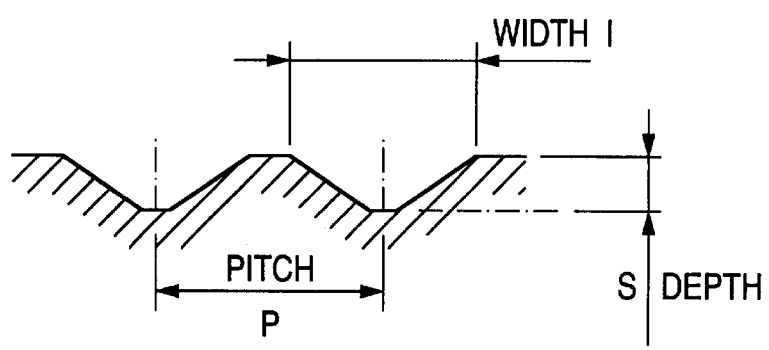
FIG. 11 is a view of the shape of a groove formed in a brake drum.

And, FIG. 11 shows one of the grooves 21 in an enlarged manner, in which reference character I stands for the width of the groove 21, S stands for the depth of the groove 21, and P stands for the pitch of the groove 21, respectively. Preferably, the groove may be shaped such that the groove pitch is 0.3 to 2 mm, the groove depth is 2 to 100 $\mu$m, and the groove width is 0.1 to 1.4 mm.

Figure 12:
FIG. 12 is a view of an example of the shape of a groove formed in a brake drum.
Figure 13:
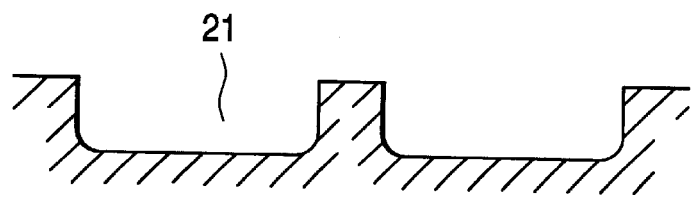
FIG. 13 is a view of a further example of the shape of a groove formed in a brake drum.
Figure 14:
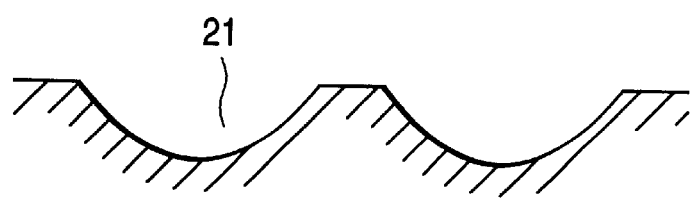
FIG. 14 is a view of a still further example of the shape of a groove formed in a brake drum.

In FIGS. 12, 13 and 14, there are shown various shapes of the groove. In particular, in FIG. 12, the groove 21 has a semi-circular shape; in FIG. 13, the groove 21 has a rectangular shape; and, in FIG. 14, the groove 21 has a tapered shape.

As has been described hereinbefore, according to the invention, since there is provided a brake drum having the above-mentioned structure, the grooves formed on the slide surface of the brake drum can provide line contact with respect to a friction member instead of surface contact provided in the conventional structures, which eliminates the influences of an oil film produced in the early fastening stage of a brake band or a friction member, thereby increasing the biting property of the brake band. On the other hand, during the fastening and sliding operation of the brake drum, the grooves are respectively filled with lubrication oil and thus the friction surface of the brake band is always lubricated during the fastening operation. Due to this, in spite of the increased biting property of the brake band, the friction coefficient $\mu$ of the brake band can be prevented from increasing and, at the same time, since the friction heat is cooled and released due to such lubrication, the temperature of the friction surface of the brake band can be lowered. Further, because the grooves are respectively so arranged as to extend in parallel to the sliding direction of the brake drum, any rake angle is prevented from occurring with respect to the frictional sliding, which makes it possible to reduce the wear of the brake band which otherwise could be caused by shaving.

Therefore, according to the invention, the friction property of a brake drum for use in an automatic transmission in a car and the like can be stabilized to thereby provide an improved speed change performance. That is, due to the improved heat resistance and wear resistance of the brake drum, the brake drum is able to maintain its high speed change performance over a long period of time.

What is claimed is:

1. A brake comprising:

a brake drum having a first slide surface; and a brake shoe having a second slide surface for sliding across said first slide surface in a sliding direction;

wherein said first slide surface has a plurality of grooves (1) provided between a plurality of engagement apices, and (2) extending parallel to the sliding direction along the entire length of said grooves;

wherein, when said second slide surface slides across said first slide surface, said second slide surface contacts said engagement apices, but not said grooves;

wherein said grooves prevent rake angle to reduce wear or abrasion;

wherein said grooves stabilize said brake to obtain satisfactory performance; and wherein said grooves enhance heat resistance.

2. A brake according to claim 1, wherein said grooves have a pitch of 0.3 to 2 mm, a depth of 2 to 100 $\mu$m, and a width of 0.1 to 1.4 mm.

3. A brake according to claim 1, wherein said grooves have a semi-circular shape.

4. A brake according to claim 1, wherein said grooves have a rectangular shape.

5. A brake according to claim 1, wherein said grooves have a tapered shape.

6. A brake according to claim 1, wherein said first slide surface has a cylindrical shape.

7. A brake according to claim 6, wherein said first slide surface faces radically outward.

8. A brake according to claim 1, wherein said grooves are adapted to accommodate a lubricant.

* * * * *